United States Patent [19]

Heaton et al.

[11] Patent Number: 5,505,411
[45] Date of Patent: Apr. 9, 1996

[54] HARNESS FIXING DEVICE

[75] Inventors: Thomas Heaton, Partington, England; Edward P. Dyer, Germantown, Wis.

[73] Assignee: Tyton Corporation, Milwaukee, Wis.

[21] Appl. No.: 253,574

[22] Filed: Jun. 3, 1994

Related U.S. Application Data

[63] Continuation-in-part of Ser. No. 968,599, Oct. 29, 1992, abandoned.

[51] Int. Cl.6 .................................................. F16L 3/08
[52] U.S. Cl. ........................ 248/70; 248/68.1; 248/73
[58] Field of Search ............................ 248/58, 70, 73, 248/224.3, 225.1, 68.1, 67.7

[56] References Cited

U.S. PATENT DOCUMENTS

| | | | |
|---|---|---|---|
| 1,709,898 | 4/1929 | Cunneen | 248/70 |
| 2,560,486 | 7/1951 | Shears | 248/68.1 |
| 3,494,580 | 2/1970 | Thorsman | 248/68.1 |
| 3,807,675 | 4/1974 | Seckerson et al. | 248/73 |
| 4,705,245 | 10/1987 | Osada | 248/68.1 |
| 4,811,922 | 3/1989 | Yoneyama | 248/73 |
| 5,014,939 | 5/1991 | Kraus et al. | 248/70 |
| 5,160,812 | 11/1992 | Takahashi et al. | 249/73 |

FOREIGN PATENT DOCUMENTS 696003  10/1965  Italy .......................................... 248/70

*Primary Examiner*—Hwei-Siu Payer
*Attorney, Agent, or Firm*—Michael, Best & Friedrich

[57] ABSTRACT

A fixing device for fixing cable harnesses to panels or other structures, having an elongate element which can be secured to the harness. A fastening element is fitted to the elongate element via a portion which is movable longitudinally relative to the elongate element. The fastening element is formed with a projection or a socket for fixing it to the panel.

20 Claims, 3 Drawing Sheets

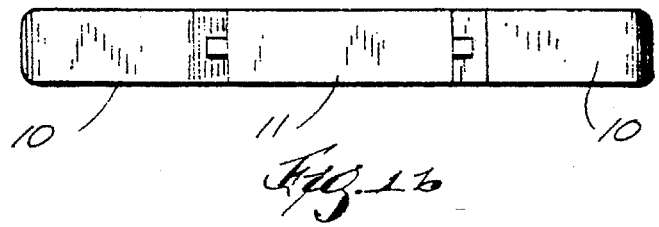
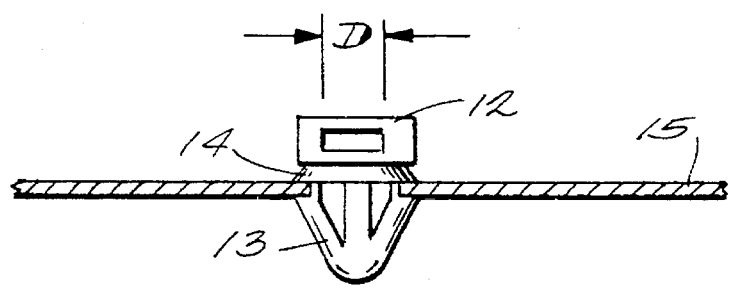
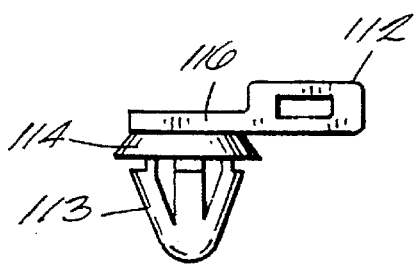
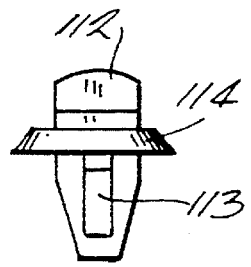

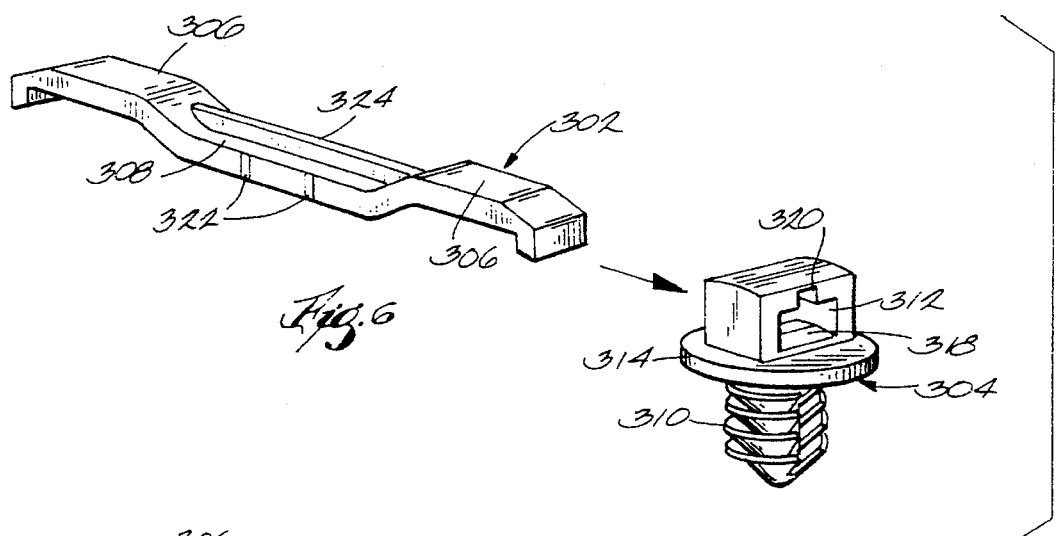
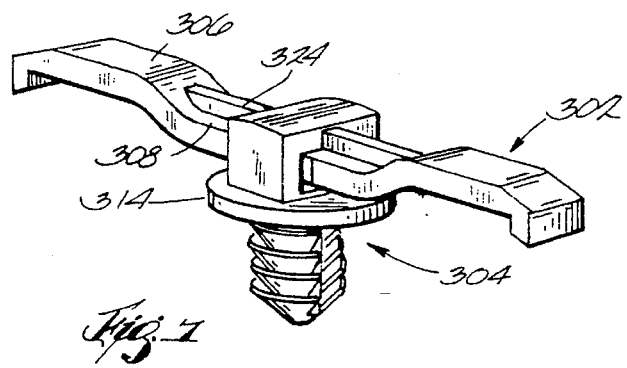
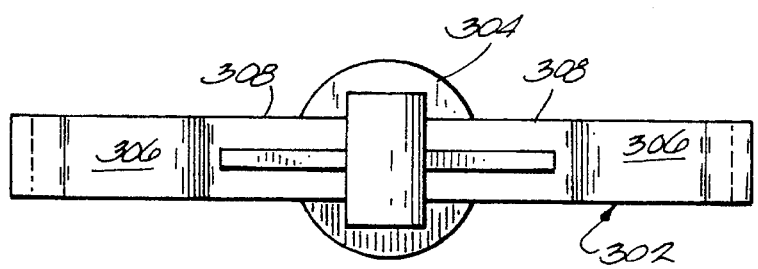 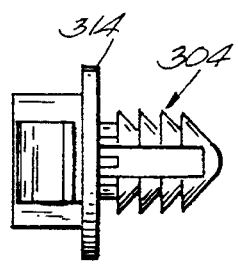

HARNESS FIXING DEVICE

This is a continuation-in-part of application Ser. No. 07/968,599 filed Oct. 29, 1992, entitled "HARNESS FIXING DEVICE", now abandoned.

FIELD OF THE INVENTION

This invention relates to a device for fixing a cable harness or other elongate body to a panel or other structure.

BACKGROUND OF THE INVENTION

A current system widely used in securing a cable harness to panels is to employ a "coathanger" type of fixing device having an elongate portion which is taped onto the harness by the harness manufacturer. The harness is then secured into position by passing integral arrowhead clips of the fixing devices through mating holes drilled in the panels. If the holes are not in alignment with the taped on fixing devices, problems occur in securing the harness into position. This is a problem often encountered in the automotive industry.

SUMMARY OF THE INVENTION

In accordance with this invention, there is provided a fixing device comprising an elongate element which can be secured to an elongate body, and a fastening element movable longitudinally relative to the elongate element.

In use, the elongate element is positioned against the harness or other elongate body and generally parallel thereto, and is then secured to the harness for example by taping the opposite ends of the elongate element to the harness. Then in fixing the harness to a panel or other structure, the fastening element can be moved longitudinally relative to the elongate element in order to align it with fixing points of the panel, etc.

The elongate element and fastening element of the fixing device may be formed as two separate parts engaged together, the fastening element being slidable along the elongate element. In this case, the elongate element may be slidable through an eyelet in the fastening element.

The fastening element may comprise a projection for insertion into a hole in a panel. Preferably, this projection comprises a non-return clip, e.g., of conventional arrowhead type.

The fastening element may however be formed with other means for fixing it to a panel or other structure. As one example, it may comprise a tubular portion for push-fitting over a projecting stud on the panel, etc. As another example, it may comprise an apertured portion enabling it to be fixed to the panel, etc. by means of a rivet, screw, etc.

The fixing device may be arranged so that the elongate element lies on the axis of the projecting clip or other means of fixing the fastening element to the panel, etc. Instead, however, the fastening element may be arranged to position the elongate element radially outward (or laterally offset from) the axis of the projecting clip, etc.

Embodiments of this invention will now be described by way of examples only and with reference to the accompanying drawings, in which:

FIG. 1A is a side view of a tape bar of a harness fixing device;

FIG. 1B is a plan view of the tape bar of FIG. 1A;

FIG. 2 is a view of an in-line arrowhead clip fastening element;

FIG. 3A is a side view of an offset arrowhead clip fastening element;

FIG. 3B is an end view of the offset arrowhead clip fastening element of FIG. 3A;

FIG. 6 is an exploded perspective view of a tape bar and clip of an alternative embodiment of the invention.

FIG. 7 is a perspective view of the tape bar and clip of FIG. 6 after being assembled together.

FIG. 8 is a top view of the assembled tape bar and clip of FIG. 7.

FIG. 9 is a side view of the assembled tape bar and clip of FIG. 7.

DESCRIPTION OF THE PREFERRED EMBODIMENT

Referring to FIGS. 1A and 1B, there is shown a tape bar for fixing longitudinally to a harness. The tape bar comprises two flat raised portions 10 at either end, which will be secured to the harness, e.g., by taping, and a flat central lower portion 11 which is displaced out of the plane of the end portions. The distance of displacement is large enough to allow one of the fastenings shown in FIGS. 2, 3A, and 4 to be freely moved along the bar when the latter has its ends fixed to the harness, allowing securement to displaced holes or pegs on the panel to which it is to be fixed.

Figure 5:
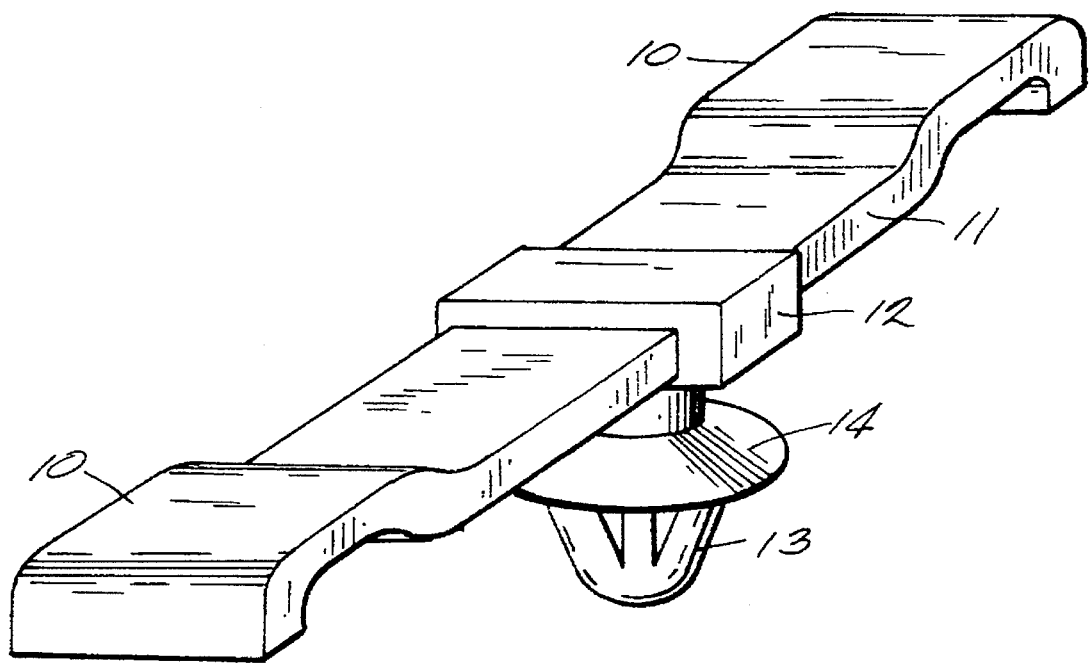
FIG. 5 is a view of an in line arrowhead clip fastening element attached to the tape bar of FIG. 1.

Referring to FIG. 2, there is shown an in-line fastening element comprising a well-known arrowhead clip 13 for passing through a hole of diameter D in a panel 15, a radial clip plate 14 for retaining the clip at right angles to the plane of the panel 15 and an eyelet 12 having a rectangular hole through which the tape bar 10, 11 of FIG. 1 can be inserted, as shown in FIG. 5.

Referring to FIGS. 3A and 3B, there is shown an offset fastening element comprising an arrowhead clip 113 for passing through a hole in the panel 15, a radial clip plate 114, a connecting bar 116 projecting or offset radially relative to the axis of the arrowhead clip 113 and having an eyelet 112 at its outer end. This offset fastening element may be used in circumstances when the hole in the panel is displaced laterally in relation to the axis of the harness. Any longitudinal misplacement of the holes can be overcome by sliding the fastening element along the tape bar 10, 11.

Figure 4:
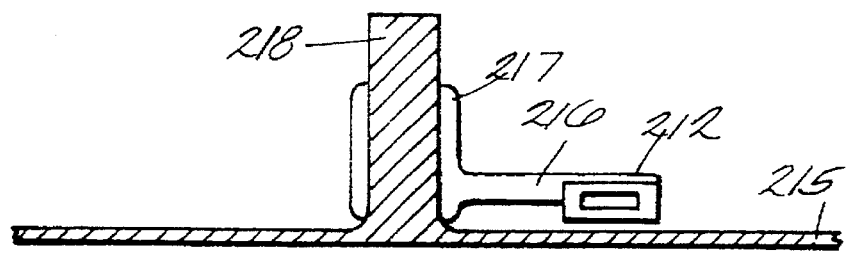
FIG. 4 is a view of an offset fastening element for threaded welded studs.

Referring to FIG. 4, there is shown an offset fastening element comprising a hollow tube 217 with annular grooves (not shown) on its inner surface, for fixing to a conventionally threaded stud 218 welded to a panel 215 and a radially projecting connecting bar 216 having an eyelet 212 at its outer end.

The annular grooves in the hollow tube 217 are so arranged, e.g., having an inner diameter which is less than the outer diameter of the threads on stud 218, so that the fastening element forms a non-return push fit with the threaded stud 218. Any longitudinal displacement of the stud can be overcome by moving the eyelet 212 longitudinally along the tape bar 10, 11.

Referring to FIGS. 6–9, there is shown an alternative fixing device 300 comprising a tape bar 302 and a fastening element 304.

The fastening element 304 is similar to the fastening element shown in FIG. 2, and has a radial clip plate 314 and an eyelet 312 in the shape of a closed annulus, except that the fastening element 304 has a fir tree clip 310 instead of the arrowhead clip, and the inside of the eyelet 312 of the fastening element 304 has a lower ramped surface 318 proximate the radial clip plate 314 and has a key slot 320 opposite the ramped surface 318. An advantage of using the fir tree clip 310 instead of the arrowhead clip is that the resulting fastening element 304 can be used with mounting surfaces of widely varying thicknesses. The fir tree clip 310 includes annular rings which provide additional support in the hole in the mounting surface with which the fastening element 304 is used.

The tape bar 302 is similar to the tape bar shown in FIG. 1, and includes opposite, spaced apart, flat raised portions 306 at either end, and a central lower portion 308, except that the tape bar 302 includes a pair of spaced apart dimples or protrusions 322 on a side of the tape bar, which dimples 322 locate the tape bar 302 centrally with respect to the fastening element 304. The dimples 322 can be overcome and the tape bar 302, when in use, need not necessarily be located centrally with respect to the tape bar 302 unless this is desired. The tape bar 302 further includes a key 324 extending along the top of the central lower portion 308, in the direction between the raised portions 306, for engaging the key slot 320 and for providing additional stability against rotation of the tape bar 302 relative to the fastening element 304. The dimples 322, the key 324 and keyslot 320, and the ramped surface 318 all act to stabilize the tape bar 302 with respect to the fastening element 304.

Further embodiments may include fastening elements arranged to be fixed to panels or other structure using nuts and bolts, screws, rivets and "T" studs, all of which fastening elements can be either of the in-line or off-set type. Molded ties may also be used instead of tape to secure the bar 10, 11 to the harness. Further, the fastening element may be arranged so that it can be removed from the tape bar 10, 11 once the latter has been secured to the harness, to allow another type of fastening element to be attached to the tape bar 10, 11 in its place.

We claim:

1. A fixing device for securing elongated members to a surface, said fixing device comprising:

a fastening element including means for non-releasably engaging the surface, said fastening element having therethrough a bore, and an elongate element inserted into said fastening element via said bore, wherein said elongate element has a flat central portion and a raised flat portion at either end of said flat central portion, said raised flat portions are adapted to secure the elongated members to the surface via said fastening element, and wherein said fastening element is slidable relative to said elongate element after the elongated members have been secured to said raised flat portions.

2. A fixing device as set forth in claim 1 wherein said means for non-releasably engaging the surface includes an arrowhead clip.

3. A fixing device as set forth in claim 1 wherein said elongate element has a cross sectional shape, and wherein said bore in said fastening element has a cross sectional shape corresponding to said cross sectional shape of said elongate element and preventing rotation, in said bore, of said elongate element relative to said fastening element.

4. A fixing device in accordance with claim 1 wherein said fastening element comprises a fir tree clip.

5. A fixing device comprising:

a fastening element having therethrough a bore and an elongate element which can be secured to an elongate surface via said fastening element and which secures elongate bodies to the surface, wherein said elongate element has a central section, wherein said elongate element is selectively inserted into said fastening element through said bore, wherein said fastening element is movable relative to said elongate element when said elongate element is inserted in said bore of said fastening element, and wherein said elongate element includes two flat raised end portions, one at either end of said central section which are adapted to secure the elongate bodies to the surface.

6. A fixing device in accordance with claim 5 wherein said fastening element comprises a fir tree clip.

7. A fixing device in accordance with claim 5 wherein said elongate element further includes means for selectively centering said fastening element relative to said elongate element.

8. A fixing device in accordance with claim 7 wherein said centering means comprises a pair of spaced apart dimples on said elongate element.

9. A fixing device for securing objects to a surface, said fixing device comprising:

a tape bar having opposite end portions, said end portions being adapted to receive the objects and a flat center portion integral with and between said end portions; and a fastening element having therein an aperture and including a fastener for securing said fixing device to a location on the surface, wherein said center portion of said tape bar extends through said aperture, wherein the cross-section of said aperture and said center portion are complementary, and wherein said fastener is movable relative to and along said center portion of said tape bar so that after said tape bar has received said objects, said fastener is alignable with the location on the surface to which said fastener is to be secured.

10. A fixing device as set forth in claim 9 wherein said end portions of said tape bar are raised with respect to said center portion.

11. A fixing device as set forth in claim 9 wherein said fastener includes a non-return clip.

12. A fixing device as set forth in claim 9 wherein said fastener includes an arrowhead clip.

13. A fixing device as set forth in claim 9 wherein said fastener includes a tubular portion adapted to push-fit over a projecting stud on the surface.

14. A fixing device as set forth in claim 9 wherein said fastening element has a longitudinal axis and said aperture and said fastener are co-axially aligned along said axis.

15. A fixing device as set forth in claim 9 wherein said fastening element has a longitudinal axis, said aperture is aligned with said axis, and said fastener is nonaligned with said axis.

16. A fixing device as set forth in claim 9 wherein said fastener includes a fir tree clip.

17. A fixing device as set forth in claim 9 wherein said aperture of said tape bar has a ramped surface.

18. A fixing device as set forth in claim 9 wherein said aperture has a key slot and said center portion of said tape bar has a key for engaging said key slot.

19. A fixing device as set forth in claim 9 wherein said tape bar includes means for selectively centering said fastener relative to said center portion of said tape bar.

20. A fixing device as set forth in claim 19 wherein said centering means includes a pair of space apart dimples.

* * * * *